United States Patent [19]

Tamura

[11] 4,221,475
[45] Sep. 9, 1980

[54] CAMERA HAVING FOCUS ADJUSTING DEVICE

[75] Inventor: Shuichi Tamura, Yokohama, Japan

[73] Assignee: Canon Kabushiki Kaisha, Tokyo, Japan

[21] Appl. No.: 965,432

[22] Filed: Dec. 1, 1978

[30] Foreign Application Priority Data

Dec. 9, 1977 [JP] Japan .............................. 52-148517

[51] Int. Cl.³ ............................................. G03B 3/00
[52] U.S. Cl. ..................................................... 354/25
[58] Field of Search ....................... 354/25, 195, 198; 352/140; 355/56

[56] References Cited

U.S. PATENT DOCUMENTS

4,154,517  5/1979  Tamura et al. ........................ 354/25

FOREIGN PATENT DOCUMENTS

1197316  7/1965  Fed. Rep. of Germany .

*Primary Examiner*—Michael L. Gellner
*Attorney, Agent, or Firm*—Toren, McGeady and Stanger

[57] ABSTRACT

A camera having an automatic focus adjusting device with an arrangement that permits manual focus adjustment by moving a focus adjusting member to a desired position by means of an operation member when automatic focusing is impossible. The camera includes an automatic focus detecting circuit including a photoelectric light sensor, a photographic lens and a focus adjusting member for holding the photographic lens. The member is movable within a certain determined range for focusing by means of a spring. A latch device for latching the focus adjusting member in a focus adjustment start position is included. The latch device is arranged to release the focus adjusting member from the state of being latched to cause the focus adjusting member to start automatic focusing in response to a shutter release operation. A stop is arranged for stopping the focus adjusting member at the in-focus position in response to the output of the automatic focus detecting circuit. An operation member is provided for adjusting the stop position of the focus adjusting member. Finally, a change-over device is included for releasing the latch device irrespective of the shutter release operation of the camera. The change-over device is shiftable between an automatic focus adjusting position and a manual focus adjusting position.

4 Claims, 7 Drawing Figures

(a) ABSOLUTE VALUE SUMMING CIRC. 51 OUTPUT

(b) DIFFERENTIATION CIRC. 40 OUTPUT $\left(V_1 = \dfrac{R_1}{R_1+R_2}V\right)$ (c) COMPARATOR COM OUTPUT

IN FOCUS (d) FLIP FLOP FF Q OUTPUT (e) TRANSISTOR Tr OUTPUT

MAIN SWITCH ON

CAMERA HAVING FOCUS ADJUSTING DEVICE

FIELD OF THE INVENTION

The present invention relates to a focus adjustment system for a camera, particularly having an automatic focus adjustment device so designed that the focus can also be manually adjusted.

BACKGROUND OF THE INVENTION

Various kinds of the cameras having a photoelectric distance measuring device for moving the photographing lens in accordance with the distance from the camera to the object in order to automatically adjust the focus have already been proposed. Further, a camera whose photographing lens is moved by means of a spring for the automatic focus adjustment has been disclosed, for example, by the German Pat. No. 1197316.

This kind of camera is inconvenient when two objects, whose distances from the camera are different, are photographed. Namely, in the case of the camera having a conventional distance meter, either the one object is focused or the distances to the two object are measured separately and the mean value is adopted for focusing, and the deviation is covered with the object field depth. However, the case of a camera having an automatic focus adjusting device, the mark for indicating the distance measuring range is generally provided at the center of the view finder frame; the object distance is measured while the important part of the object is placed within the mark. Consequently, it is impossible to focus the position between the two objects when the two objects whose distances from the camera are different are photographed at the same time. Further, when the one object is placed in the afore mentioned mark, there is a danger that the other one should be out of the picture frame, while the automatic focus adjustment is impossible.

SUMMARY OF THE PRESENT INVENTION

A purpose of the present invention is to provide a focus adjusting device in accordance with which, in the above mentioned case, the automatic focus adjustment mode can easily be changed over into the manual focus adjusting mode by means of a simple operation.

In order to attain the above mentioned purpose, a change over member movable between the automatic focus adjusting position and the manual focus adjusting position is provided in such a manner that when the change over member is at the automatic focus adjusting position, the focus adjustment member is controlled by means of the output of the distance measuring device, while when the change over member is at the manual focus adjusting position, the focus adjusting member is manually controlled by means of the change over means.

Further, in the embodiment of the present invention, the manual focus adjusting mode is displayed in the view finder when the mode is manual.

Further purposes and features of the present invention will be disclosed below in accordance with the accompanying drawings of the embodiment of the present invention.

DESCRIPTION OF THE PREFERRED EMBODIMENTS

Figure 1:
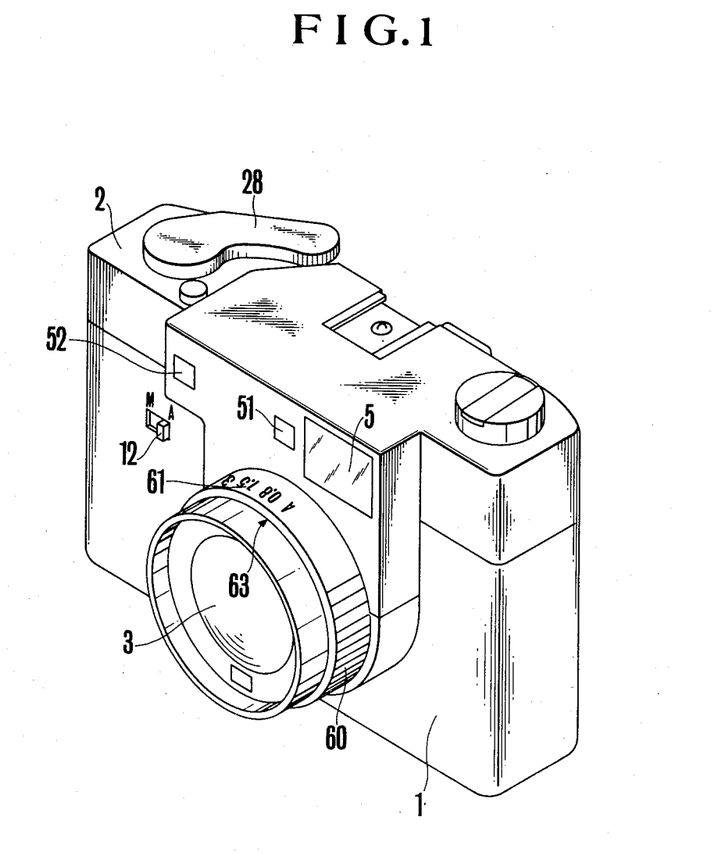
FIG. 1 shows a camera in which the focus adjusting method in accordance with the present invention is applied in perspective view.

In FIG. 1, 1 is the camera body, 2 is the upper cover and 3 is the photographing lens. 51 and 52 are the light receiving windows of the distance measuring device and 5 is the window of the view finder.

Figure 2:
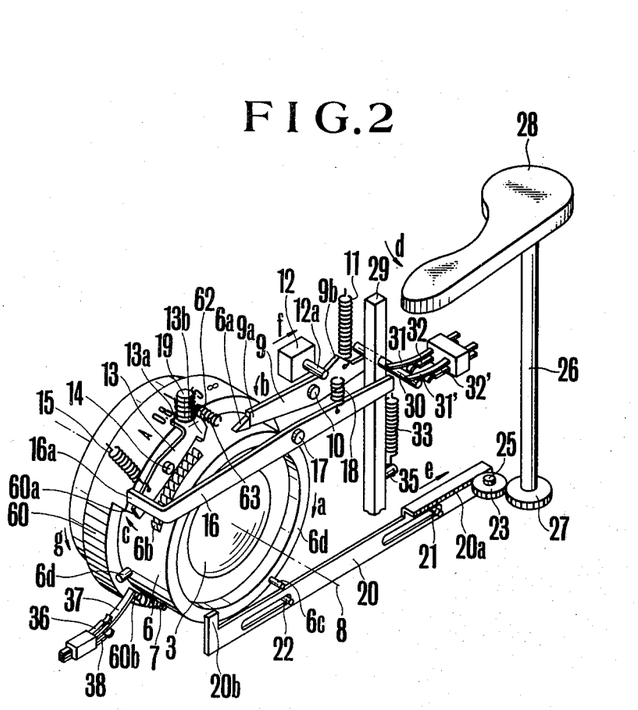
FIG. 2 shows the internal composition of a camera in which the focus adjusting method in accordance with the present invention is applied in perspective view.
Figure 3:
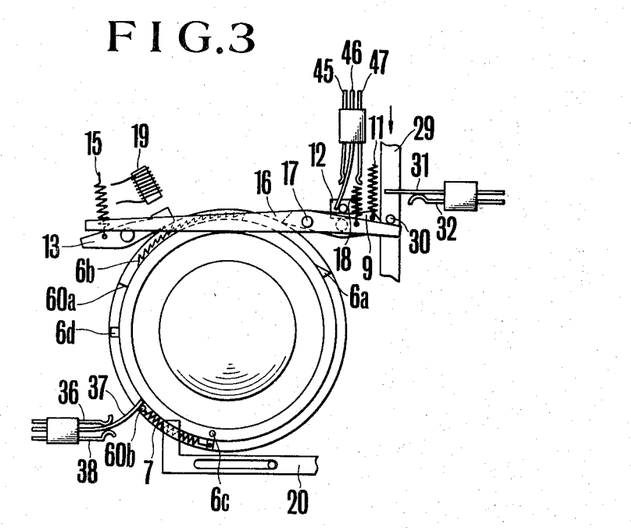
FIG. 3 shows the important parts shown in FIG. 2 in plan view.

FIGS. 2 and 3 show the focus adjustment mechanism inside the camera. In the drawings, 6 is the focus adjusting ring rotatably supported in the camera body, inside of which ring the afore mentioned photographing lens 3 is supported so as to be moved along the optical axis along with the rotation of the ring in a conventional way. 7 is a spring for urging the ring 6 along the direction of the arrow a, 6a is a projection engaged with the holding lever 9 (to be explained later) so as to hold the ring 6 at the start position against the strength of the spring 7 and 6b is the ratchet teeth secured on the circumference of the ring 6. On the back end surface 6d of the ring 6, a cam is provided so as to be operatively engaged with the distance measuring device to be explained later. The holding lever 9 is movably supported on the fixed part of the camera by means of the shaft 10. The lever 9 is urged by means of the spring 11 in the direction along which the one end 9a is engaged with the afore mentioned projection 6a, while the other end is at the position at which the end is engaged with the pin 30 provided on the shutter release bar 29. 13 is the stop claw movably supported on the fixed part by means of the shaft 14, having one end 13b to be engaged with the afore mentioned ratchet teeth 6b as well as the bent part 13a to be attracted by means of the magnet 19 in the distance measuring circuit (to be explained later) and urged by means of a spring 15 along the direction along which the end 13b is engaged with the ratchet teeth 6b.

16 is a set lever rotatably supported by means of the shaft 17, being urged by means of a spring 18 in such a manner that the bent arm 16a at the one end is engaged with the back end of the afore mentioned stop claw 13 so as to separate the end 13b from the ratchet teeth 6b against the spring 15, while the other end is at the position at which the end is engaged with the pin 30 on the afore mentioned release bar.

6c is a pin provided at the rear end of the focus adjusting ring 6. 28 is a conventional winding up lever operatively engaged with the shutter and the film feeding mechanism (not shown in the drawing), 26 is the winding up shaft operatively engaged with the lever, 27 is the gear fixed at the lower end of the shaft 17, 23 is the intermediary gear engaged with the gear 27, so as to be rotatable around the fixed shaft 25, and 20 is the charge plate guided by means of the pins 20 and 21 so as to be slidable in the lengthwise direction and having the ruck 20a engaged with the gear 23 and the arm 20b engaged with the pin 6c of the afore mentioned ring 6. Along with the rotation of the winding up lever 28 in the direction of the arrow d, the charge plate 20 is moved in the direction of the arrow e. The arm 20b is engaged with the afore mentioned pin 6c in such a manner that the focus adjusting ring 6 is rotated in the direction opposite to the direction of the arrow a against the strength of the spring 7 until it is stopped at the start position of the rotation by means of the holding lever 9. FIG. 2 shows this state, in which the winding up lever 28 has returned to the original position while the arm 20b of the charge plate remains at a position separated from the pin 6c.

60 is a change over ring supported on the camera body so as to be rotatable around the afore mentioned adjusting ring 6.

On the circumference of the ring 60, the mark A showing the automatic focus adjusting position and the distance scales 61 for the manual focus adjustment are provided. Click grooves are provided at the positions corresponding to the mark A and each of the scales so as to form click stops together with the ball 62 and the spring 63 for the camera body so that the ring 60 stops at each position. 60a is a notch provided on the circumference of the change over ring so as to be engaged with the pin 6d provided on the circumference of the ring 6 at the time of the manual adjustment in order to rotate the ring 6 against the strength of the spring 7 and so as to serve as the stopper for limiting the rotation range of the ring at the time of the automatic adjustment. 60b is the switch change over pin provided on the end surface of the change over ring 60 so as to change over the switch contact 37 in the circuit shown in FIG. 4 between the fixed contacts 36 and 37 in accordance with the focus adjusting mode (automatic respectively manual). 12 is the change over knob slidably arranged on the front surface of the camera, having a pin 12a for changing over the switch contact 46 in the circuit shown in FIG. 5 between the fixed contacts 45 and 47 in accordance with the focus adjusting mode (automatic respectively manual). The pin 12a is engaged with the cam surface provided on the afore mentioned holding lever 9 so as to push the cam surface 9b when the knob 12 is moved along the direction of the arrow f. This is done in such a manner that the lever 9 is rotated along a direction opposed to the arrow b so as to release the holding of the focus adjusting ring 6. 31, 32 and 31', 32' are the contacts of the power source switch.

Figure 4:
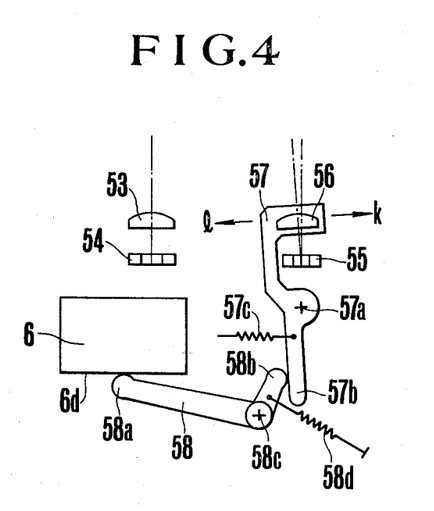
FIG. 4 shows the arrangement of the distance measuring device.

FIG. 4 shows the arrangement of the distance measuring device to be used in accordance with the present invention. In the drawing, 53 is the first image forming lens arranged behind the window 51 in the afore mentioned upper cover 2. On the same plane as the image forming plane of the lens 53, a first photosensor array 54 having a plurality of photosensors 54a –54d is fixedly arranged in such a manner that the center of the array 54 is in alignment with the optical axis of the lens 53.

56 is the second image forming lens arranged at a certain determined distance from the first lens 53. 57 is a holding lever for holding the lens 56, supported so as to be rotatable around the shaft 57a and serving to move the lens 56 along the directions of the arrows k and l. Behind the lens 56 and on the same plane as the focal plane of the lens, a photosensor array 55 composed in the same way as the afore mentioned array 54 is fixedly arranged. 58 is an operatively engaging lever presenting the one arm 58a to be engaged with the cam on the rear end surface 6d of the afore mentioned focus adjusting ring 6 and the other arm 58b to be engaged with the holding member 57, being rotatably supported by means of the shaft 59c on the fixed part of the camera and urged by means of the spring 58d in such a manner that the arm 58a is normally in contact with the cam 6d. The holding member 57 is attracted by means of a comparatively weak spring 57c in such a manner that the one end 57b is normally in contact with the arm 58b of the operatively engaging lever 58 and along with the rotation of the focus adjusting ring 6, the second image forming lens 56 is moved between the position at which the image of the object at a very near distance is correctly matched at the center of the photosensor array 55 and the position at which the image of the object at the infinite distance is correctly matched at the center of the photosensor array 50. The afore mentioned cam 6d has a certain relation with the lens 56 in such a manner that the photographing lens 3 is set in the in focus position for the object when the relative positional parallax between the two images on the arrays 54 and 55 becomes zero during the movement of the lens 56.

Figure 5:
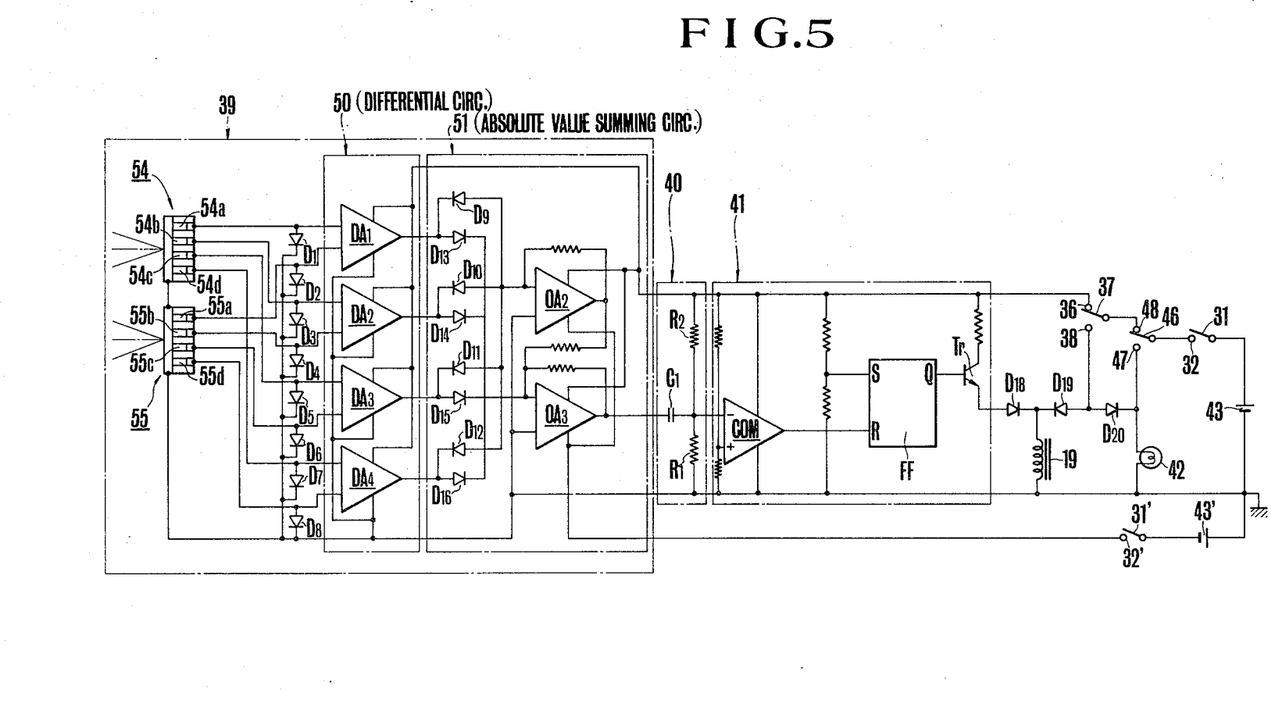
FIG. 5 shows the electrical circuit of the automatic focus adjustment device.

FIG. 5 shows a circuit for driving the afore mentioned distance measuring device. In the drawing, 31, 32 and 31', 32' form a power source switch to be operated by means of the shutter release bar, 36, 37 and 38 is an auto-manual change over switch to be operated by means of the change over ring 60, 45, 46 and 47 is a change over switch to be operated by means of the afore mentioned change over knob 12, 42 is the lamp for indicating in the view finder that the then focus adjusting mode is manual and 43 and 43' are the batteries.

39 is the in focus state detecting circuit including the afore mentioned photosensor arrays, 40 is the differentiating circuit and 41 is the switching circuit for stopping the current supply to the magnet 19 when the in focus state is obtained.

$D_1$–$D_8$ are the diodes for logarithmically compressing the output of the photosensors 54a–54d and 55a–55d in the arrays 54 and 55, 50 indicates the differential circuit consisting of the same number of the differential amplifier $DA_1$–$DA_4$ as that of the photosensor pairs for obtaining the differences (namely, the ratio between the outputs in the sensor pairs) between the outputs logarithmically compressed of the sensor pairs 54a–55a, 54b–55b, 54c–55c, 54d–55d in the relative positions to each other in the arrays 54 and 55.

51 is the absolute value summing circuit for summing up the absolute value of the outputs of the differential amplifiers $DA_1$–$DA_4$ in the differential circuit 50, consisting of a combination of the first circuit part composed of the diodes $D_9$–$D_{12}$ acting for the negative input signals and the first operational amplifier OA with the second circuit part composed of the diodes $D_{13}$–$D_{16}$ acting to the positive input signals and forwardly connected to each other and the second operational amplifier $OA_2$.

Figure 7:
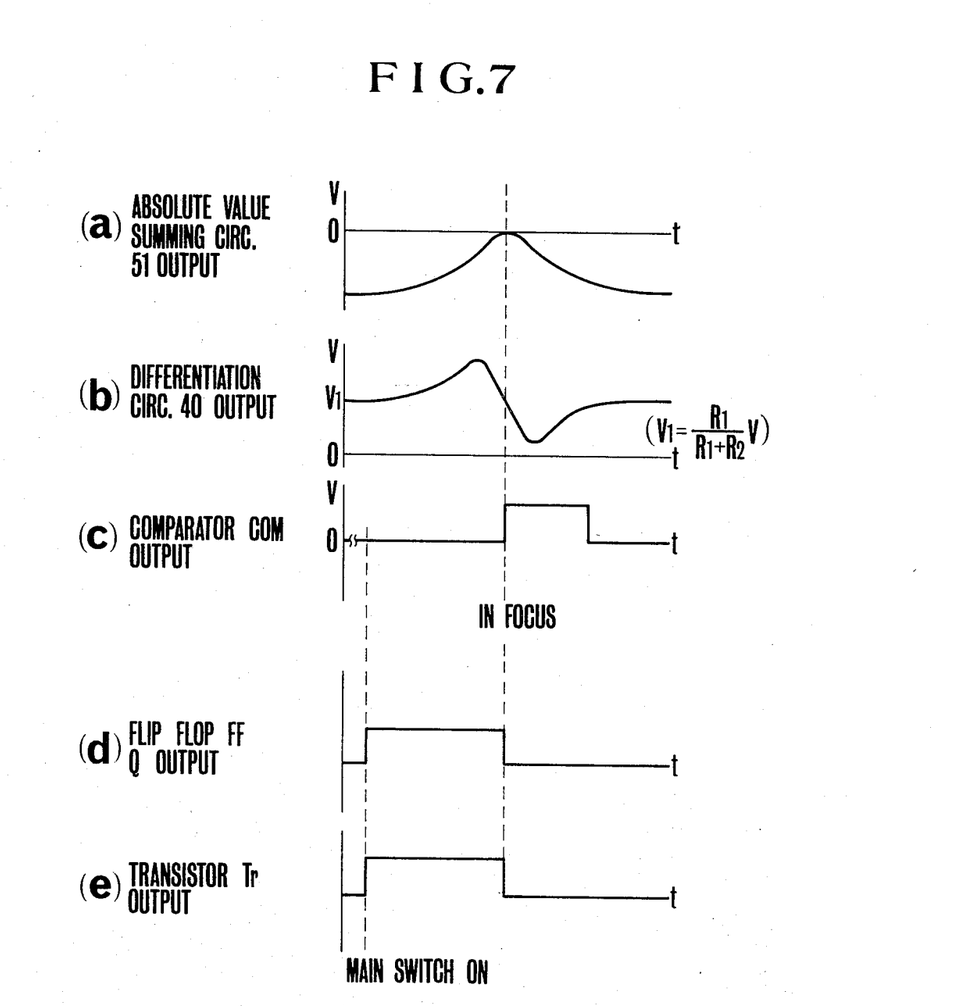
FIG. 7 shows the forms of the output waves of the circuit shown in FIG. 5.

The first and the second operational amplifier $OA_2$ and $OA_3$ are set in the inverting amplifying mode, so that the output of the absolute value summing circuit 51 presents a negative value ideally reaching zero when, as is shown in FIG. 7(a), the image forming positions on the arrays 54 and 55 are relatively brought into alignment with each other, so that the outputs of the sensors in the photosensor pairs 54a–55a, 54b–55b, 54c–55c and 54d-55d becomes altogether equal to each other in such a manner that all the outputs of the differential amplifiers DA₁-DA₄ in the differential circuit 51 are zero.

40 is the differentiation circuit for differentiating the output of the above mentioned absolute value summing circuit 51, consisting of the condensor $C_1$ and the register R so as to differentiate the output of the circuit 51 at the time of focusing and produce an output whose symbol abruptly changes out of positive into negative as soon as the in focus position is passed over as is shown in FIG. 7(b). 41 is the switching circuit, while COM is the comparator for comparing the output of the afore mentioned differentiation circuit 40 with zero, whereby the output of the circuit 40 is applied to the (−) input terminal of COM so that a pulse-shaped output is produced as is shown in FIG. 7(e) when the differentiation circuit 40 produces a negative output. FF is the Flip-Flop which is brought into the set state because the pulse produced when the afore mentioned switch is closed is applied to the set input terminal S and the reset state because the output of the afore mentioned comparator COM is applied to the reset input terminal R, Tr is a transistor whose base is connected to the Q output of the Flip-Flop and whose emitter is connected to the magnet 19 through the diode D.

Below the operation of the embodiment will be explained.

In the case of the automatic focus adjustment, when the mark A of the change over ring 60 is set at the index 63, the pin 60b drives the contact 37 into contact with the fixed contact 36. It is supposed that at this time, the knob 12 is at the position A, while the contact 46 of the change over switch is in contact with the contact 45. When the winding up lever 28 is rotated along the direction of the arrow d, the charge plate 20 is moved along the direction of the arrow e through the shaft and the gears 27 and 28, whereby the arm 20b is engaged with the pin 6c of the focus adjusting ring 6, so as to rotate the ring against the strength of the spring 7 along the direction opposed to the arrow a. When the ring 6 has rotated by a certain determined angle, the end 9a of the holding lever 9 is engaged with the projection 6a. When after that the finger is brought away from the winding up lever, the winding up lever is brought back to the original position by means of the return spring, while the charge plate also assumes the original position, whereby the focus adjusting ring 6 which is kept with the holding lever 9 remains at the start position of rotation.

At this time, the photographing lens 3 is set in the state in which the object at a very near distance is in focus, while the afore mentioned second image forming lens 56 has been brought, by means of the cam 6d of the focus adjusting ring and the levers 58 and 57, at the position at which the image of the object at a very near distance is correctly matched at the center of the photosensor array 55.

The stop claw 13 is rotated by means of a comparatively strong spring 18 against the spring 15 through the set lever 16, whereby the afore mentioned bent part 13a is pushed against the magnet 19, while the end 13b is at a position at which the end 13b is not engaged with the ratchet teeth 6b.

When then the camera is directed toward the object and the shutter button is operated, the release bar 29 is moved downwards whereby the contacts 31 and 32, 31' and 32' kept apart by means of the pin 30 are brought into contact with each other, the Flip-Flop FF is set, the transistor Tr is brought into the conductive state and a current is supplied to the magnet 19, while the current is also supplied to the afore mentioned automatic in focus state detecting circuits 39 and 40 so as to bring the circuits in the operative state.

When, in the above mentioned state the object is not at a photographable near distance, the position of the object image formed by the second photographing lens 56 on the second photosensor array 55 is relatively out of the position of the object image formed by the first photographing lens 53 on the first photosensor array 53.

When the shutter button is further pushed down, the holding lever 9 and the set lever 16 are rotated by means of the pin 30 against the strength of the springs 11 and 18 until the lever 9 releases the holding of the projection 6a, whereby the focus adjusting ring 6 is rotated along the direction of the arrow a by means of the spring 7 in such a manner that the photographing lens 3 starts to move along the optical axis. Along with the rotation of the focus adjusting ring 6 the second image forming lens 56 starts to move along the direction of the arrow k.

Consequently, the position of the object image on the second photosensor array moves in accordance with the movement of the photographing lens until the position of the object image formed on the second photosensor array 55 is brought into a relative alignment with the position of the object image formed on the first photosensor array 54, whereby all the outputs of the photosensor pairs 54a-55a, 54b-55b, 54c-55c and 54d-55d having a positional relation to each other in the arrays 54 and 55 are equal to each other so that all the outputs of the differential amplifiers DA₁-DA₄ in the differential circuit 50 become zero in such a manner that at this time the output of the absolute summing circuit 51 reaches zero as is shown in FIG. 7(a). Consequently, as is shown in FIG. 7(b), the output of the differentiation circuit 40 changes abruptly from the positive value into the negative one so that the comparator COM produces a pulse shaped signal as is shown in FIG. 7(c) in such a manner that the Flip-Flop FF is reset as is shown in FIG. 7(d) while the transistor Tr is brought into the switched off state as is shown in FIG. 7(e). Thus, the current supply to the magnet 19 is interrupted. Consequently, the stop claw 13, which is urged by means of a spring 15, is rotated along the direction of the arrow c in such a manner that the end 13b is engaged with the ratchet teeth 6b of the focus adjusting ring 6 so as to stop the ring 6 in order to stop the photographing lens 3 at the in focus position. After that, the shutter is released by means of a conventional mechanism not shown in the drawing, so as to complete the photographing. When thereafter, the finger is removed from the shutter button, the release bar is returned upwards by means of the strength of the spring 33, while the contact 31 is pushed up by means of the pin 30 so as to open the switch in order to stop the current supply to the focus detecting circuit.

Further, the holding lever 9, which is urged by means of the spring 11, is rotated in such a manner that the end 9a is in contact with the circumference of the ring 6, while the set lever 16, which is urged by means of the spring 18, is rotated until the bent arm 16a is in contact with the stop claw 13.

At this time, when the stop claw 13, which is urged by means of the spring 18, is rotated so as to be disengaged from the ratchet teeth 6a, the ring 6 is rotated until the afore mentioned pin 6d is in contact with the notch 60a of the change over ring. However, such a phenomenon is disagreeable to the photographer, giving an undesirable influence to the life of the camera. Consequently, the angle of the end 13b of the stop claw 13 is set so as to be properly engaged in the teeth 6b in such a manner that the engagement of the stop claw 13 in the ratchet teeth 6b is maintained until the ring 6 starts to rotate along the direction opposed to the arrow a by the next winding up operation. When along with the next winding up operation the stop claw is disengaged from the ratchet teeth, the stop claw 13, which is urged by means of the spring 18, is rotated against the strength of the spring 15 until the claw 13 comes in contact with the magnet 19.

Figure 6:
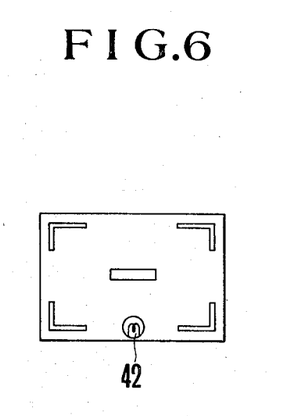
FIG. 6 shows the arrangement of the display lamp in the view field of the view finder.

Below the operation of the manual focus adjustment will be explained. When the winding up lever 28 is operated in the automatic focus adjustment mode, the arm 20b of the charge plate is engaged with the pin 6d as explained above so as to rotate the ring 6 against the strength of the spring until the ring 6 is held by means of the holding lever 9. When then the change over ring 60 is rotated along the direction of the arrow g, so as to set the desired distance scale at the index 63, the contact 37 is changed over from the side 36 to the side 38 along with the movement of the pin 60b of the ring 60. When the shutter button is operated in this state, the release bar 29 goes down so as to close the main switch. When at this time the change over knob 12 is assuming the position A, the lamp 42 is lit up by means of the circuit (power source 43(+)–contacts 31–32–46–45–37–38–diode $D_{20}$–lamp 42–power source (−)) so as to display, as is shown in FIG. 6, in the view finder that the focus adjusting mode is manual, while a current is supplied also to the magnet 19 by means of the circuit (38–diode $D_{19}$–magnet 19–power source) so as to excite the magnet 19 in order to attract the bent part 13a of the stop claw.

When the shutter button is pushed down further, the pin 30 drives the one end of the holding lever 9 and that of the set lever 16 so as to rotate them along the clockwise direction against the strength of the springs 11 and 18 in order to release the holding of the focus adjusting ring 6, which is rotated by means of the spring 7 along the direction of the arrow a until the ring 6 comes in contact with the notch 60a of the change over ring. Thus, the photographing lens 3 is moved until it reaches the distance manually set, whereby the focus adjustment is completed. At this time, the holding of the stop claw 13 with the set lever 16 has been released, being, however, attracted by means of the magnet as mentioned above in such a manner that the ring can be rotated freely.

When the change over knob 12 is moved along the direction of the arrow f into the position M after the focus adjusting ring 6 has been charged by means of the operation of the winding up lever 28 as mentioned above, the holding lever 9 is rotated by means of the pin 12a so as to release the holding of the ring 6. Consequently, the ring 6, which is urged by means of the spring 7, is rotated along the direction of a until the ring 6 is engaged in the notch 60a of the ring 6. If at this time the change over ring 60 is at the position A, the focus adjusting ring 6 is rotated by setting the ring 60 at a desired distance scale in such a manner that the focus is manually adjusted. Further, when the knob 12 is moved into the position M after the change over ring has been set at a desired distance scale, the ring 6, which is urged by means of the spring 7, is rotated until the pin 6b is engaged into the notch 60a displaced in advance in accordance with the then desired distance, so as to immediately complete the focus adjustment. When the knob is changed over into the position M as mentioned above, the display lamp 42 is lit up, while the magnet 19 is not excited.

The shutter is released after the focus adjustment in the same way as in the above mentioned case.

Below, the change over of the manual focus adjustment mode into the automatic focus adjustment mode will be explained.

When the knob 12 is moved along the direction opposed to the arrow f into the position A after the shutter has been released, the pin 12a is brought away from the cam surface 9b of the holding lever so as to be engageable with the projection 6a of the ring 6. When then the change over ring 60 is rotated along the direction opposed to the arrow g so as to set the mark A at the index 63, the switch contact 37 is changed over from the side 38 to the side 36. When then the winding up lever 28 is operated, the focus adjusting ring 6 is rotated and engaged with the holding lever in such a manner that the automatic focus adjustment is ready as mentioned above.

When the change over ring 60 is rotated along the direction of the arrow g after the knob 12 is moved into the position A as mentioned above before the shutter has been released, namely after the winding up operation has been done, the notch 60a drives the pin 6d so as to rotate the focus adjustment ring 6 against the strength of the spring 7. When the ring 60 reaches the limit end of the rotation range, the projection 6a is engaged with the holding lever 9 so as to hold the ring 6 at the charged position. When then the ring 60 is returned along the opposed direction so as to set the mark 7 at the index 63, the switch contact 37, which is also urged by means of the pin 60b, comes in contact with the side 36 in such a manner that the automatic focus adjustment is ready.

As explained above, in accordance with the present embodiment the automatic focus adjustment and the manual focus adjustment can be changed over by means of a simple operation so that the application of the automatic focus adjustment camera can further enlarged. Further another effect of the present invention is that, when the operation of the automatic focus adjustment can not be carried out continuously with the exposure operation, if it is so designed that the automatic focus adjustment operation is started with a comparatively small stroke of the shutter button while the shutter can not be released without further pushing down of the shutter button after the focus adjustment has been completed, it becomes possible to set the focus adjusting ring 6 at the charged position by means of the change over ring 60 without releasing the shutter after the automatic focus adjusting operation has once been completed.

What is claimed is:

1. A camera having a focus adjusting device comprising:
   (a) an automatic focus detecting circuit including a photoelectric light sensor;
   (b) a photographic lens;
   (c) a focus adjusting member for holding the photographic lens, said member being movable within a certain determined range for focusing by means of the strength of a spring;
   (d) latch means for latching said focus adjusting member in a focus adjustment start position, said latch means being arranged to release said focus adjusting member from the state of being latched to cause said focus adjusting member to start automatic focusing in response to a shutter release operation of the camera;

(e) stop means for stopping the focus adjusting member at the in-focus position, said means being operated in accordance with the output of the automatic focus detecting circuit;

(f) an operation member provided for adjusting the stop position of said focus adjusting member, said operation member being provided with stopping means which is arranged to come to engage with said focus adjusting member for stopping said focus adjusting member in an adjusted position thereof; and (g) change-over means for releasing said latch means irrespective of the shutter release operation of the camera, said change-over means being shiftable between an automatic focus adjusting position and a manual focus adjusting position to switch said automatic focus detecting circuit from an operative state to an inoperative state and vice versa.

2. A camera in accordance with claim 1 further comprising a display means for displaying that the focus adjusting device is in the manually operable state, said display means being operable in accordance with the operation of the operation member.

3. A camera in accordance with claim 2, wherein the display means is arranged in the view finder.

4. A camera in accordance with claim 1, wherein said operation member has a range of manual adjustment positions for effecting manual adjustment of said focus adjusting member and also has an automatic focus adjusting position which is outside of said range.

* * * * *